United States Patent
Higuchi

(10) Patent No.: US 8,264,586 B2
(45) Date of Patent: Sep. 11, 2012

(54) IMAGING APPARATUS

(75) Inventor: Manabu Higuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 445 days.

(21) Appl. No.: 12/304,373

(22) PCT Filed: Mar. 9, 2007

(86) PCT No.: PCT/JP2007/054712
§ 371 (c)(1),
(2), (4) Date: Dec. 11, 2008

(87) PCT Pub. No.: WO2007/145004
PCT Pub. Date: Dec. 21, 2007

(65) Prior Publication Data
US 2009/0189993 A1    Jul. 30, 2009

(30) Foreign Application Priority Data

Jun. 13, 2006  (JP) ................... 2006-163147

(51) Int. Cl.
*H04N 5/222* (2006.01)
*H04N 7/01* (2006.01)
*H04N 9/74* (2006.01)
*G06K 9/32* (2006.01)
*G06K 1/00* (2006.01)
*G09G 5/00* (2006.01)

(52) U.S. Cl. .............. 348/333.11; 348/333.12; 348/441; 348/581; 348/584; 382/298; 382/299; 345/3.3; 345/698; 358/1.2

(58) Field of Classification Search ............... 348/222.1, 348/240.99, 333.11, 333.12, 342, 441, 581, 348/584, 564, 565, 555, 500, 423.1; 382/298, 382/299, 260, 262, 264, 164, 171, 173, 166; 345/660, 698, 3.3, 670, 472, 472.1, 213; 358/1.2, 3.07
See application file for complete search history.

(56) References Cited

U.S. PATENT DOCUMENTS 6,243,645 B1 * 6/2001 Moteki et al. ................ 701/538
6,278,447 B1 * 8/2001 Anderson ..................... 715/723
7,714,896 B2 * 5/2010 Fukui .......................... 348/211.3
(Continued)

FOREIGN PATENT DOCUMENTS

CN          1054694 A       9/1991
(Continued)

OTHER PUBLICATIONS

International Search Report for PCT/JP2007/054712.
(Continued)

*Primary Examiner* — Jason Whipkey
*Assistant Examiner* — Marly Camargo
(74) *Attorney, Agent, or Firm* — Pearne & Gordon LLP

(57) ABSTRACT

An imaging apparatus that can output images with a plurality of resolutions is provided. The imaging apparatus comprises an imaging section (101) for imaging a subject using an imaging device (103) to generate an image signal and a resolution conversion section (110) for converting a resolution of the image signal captured by the imaging section (101) and outputting it. The resolution conversion section (110) reduces the image inputted from the imaging section (101) to a plurality of images of different sizes and outputs an embedded image in which the size-reduced images of different sizes are embedded in the input image size from the imaging section (101). Thereby, images of a plurality of image sizes can be outputted at the same time.

16 Claims, 15 Drawing Sheets

U.S. PATENT DOCUMENTS

| | | | |
|---|---|---|---|
| 7,714,926 B2* | 5/2010 | Kobayashi et al. | 348/333.11 |
| 7,768,576 B2* | 8/2010 | Yui et al. | 348/564 |
| 2001/0033303 A1* | 10/2001 | Anderson | 345/854 |
| 2004/0051784 A1* | 3/2004 | Ejima et al. | 348/207.99 |
| 2007/0076099 A1* | 4/2007 | Eshed et al. | 348/218.1 |

FOREIGN PATENT DOCUMENTS

| | | |
|---|---|---|
| CN | 1343341 A | 4/2002 |
| JP | 2001-024919 A | 1/2001 |
| JP | 2002-112212 A | 4/2002 |
| JP | 2003-032522 A | 1/2003 |
| JP | 2003-032526 A | 1/2003 |
| JP | 2003-134386 A | 5/2003 |
| JP | 2004-112579 A | 4/2004 |
| WO | 9114334 A1 | 9/1991 |
| WO | 0052640 A1 | 9/2000 |

OTHER PUBLICATIONS

Extended European Search Report for Appl. EP07738197 dated Jun. 7, 2010.

* cited by examiner

INPUT IMAGE SIGNAL

OUTPUT IMAGE SIGNAL

4VGA IMAGE OUTPUT

EMBEDDED IMAGE OUTPUT

IMAGING APPARATUS

TECHNICAL FIELD

The present invention relates to an imaging apparatus that outputs images with a plurality of resolutions.

BACKGROUND ART

In imaging apparatuses, such an art has been known that a driving method of a sensor is varied so as to output images with different resolutions. Such art is disclosed in Japanese Patent Laid-Open No. 2003-134386, for example.

Also, an imaging apparatus having a resolution conversion circuit is disclosed in Japanese Patent Laid-Open No. 2004-112579, for example.

FIG. 15 shows a block diagram of a conventional imaging apparatus. As shown in the figure, the imaging apparatus comprises an imaging circuit 1501, a memory circuit 1502, a YC processing circuit 1503, a resolution conversion circuit 1504, a compression conversion circuit 1505, a recording circuit 1506, and a display circuit 1507. The YC processing circuit 1503 reads out RAW data stored in the memory circuit 1502, converts it to YC data, and output it to the resolution conversion circuit 1504.

The resolution conversion circuit 1504 applies resolution conversion processing to an input image generated at the YC processing circuit 1503 and generates two image data: an image for display and an image for record. The resolution conversion circuit 1504 writes the two image data in two regions in the memory circuit 1502, respectively. A user sets the numbers of pixels and lines of the input image, the image for display and the image for record in advance in the resolution conversion circuit 1504.

The resolution conversion circuit 1504 is configured so as to process the input image for each line. The resolution conversion circuit 1504 executes image generating processing by determining which of the image for display and the image for record is to be generated every time the input image is processed for one line. For example, suppose that after a line L of the image for display is generated, the resolution conversion circuit 1504 determines which of the image for display and the image for record is to be generated and as a result, a line M for the image for record is generated. After that, the resolution conversion circuit 1504 further determines which of a line of the image for display (L+1) and a line of the image for record (M+1) is to be generated.

In the conventional imaging apparatus described for the first, images with a plurality of resolutions are obtained by changing sensor driving. However, the plurality of images with different resolutions can not be outputted at the same time. In the other conventional imaging apparatus, the resolution conversion circuit stores a plurality of images with different resolutions in the memory circuit and a compression conversion circuit reads out the plurality of images from the memory and executes compression. In this case, the imaging apparatus needs to be configured so that the compression conversion circuit makes an access to the memory circuit to which the resolution conversion circuit outputs the image data. That means that a plurality of circuits access the single memory circuit, which needs arbitration of memory accesses, and it is desirable that such configuration is avoided.

DISCLOSURE OF THE INVENTION

The present invention was made in view of the above background. The present invention has an object to provide an imaging apparatus that can output a plurality of images with different resolutions at the same time.

An imaging apparatus of the present invention comprises an imaging section for imaging a subject using an imaging device to generate an image signal and a resolution conversion section for converting a resolution of the image signal captured by the imaging section and outputs the converted image signal, wherein the resolution conversion section reduces a size of the image inputted from the imaging section to a plurality of size-reduced images of different sizes and outputs an embedded image in which the plurality of size-reduced images of different sizes are embedded in the input image size from the imaging section.

Another mode of the present invention is an image processing method for converting a resolution of an inputted image signal and generating a converted image signal, comprising: reducing the inputted image to a plurality of images of different sizes; and generating an embedded image in which the plurality of size-reduced images with different sizes are embedded in the inputted image size.

As described hereafter, other aspects of the invention exist. Thus, this summary of the invention is intended to provide a few aspects of the invention and is not intended to limit the scope of the invention described and claimed herein.

DESCRIPTION OF SYMBOLS

Figure 1:
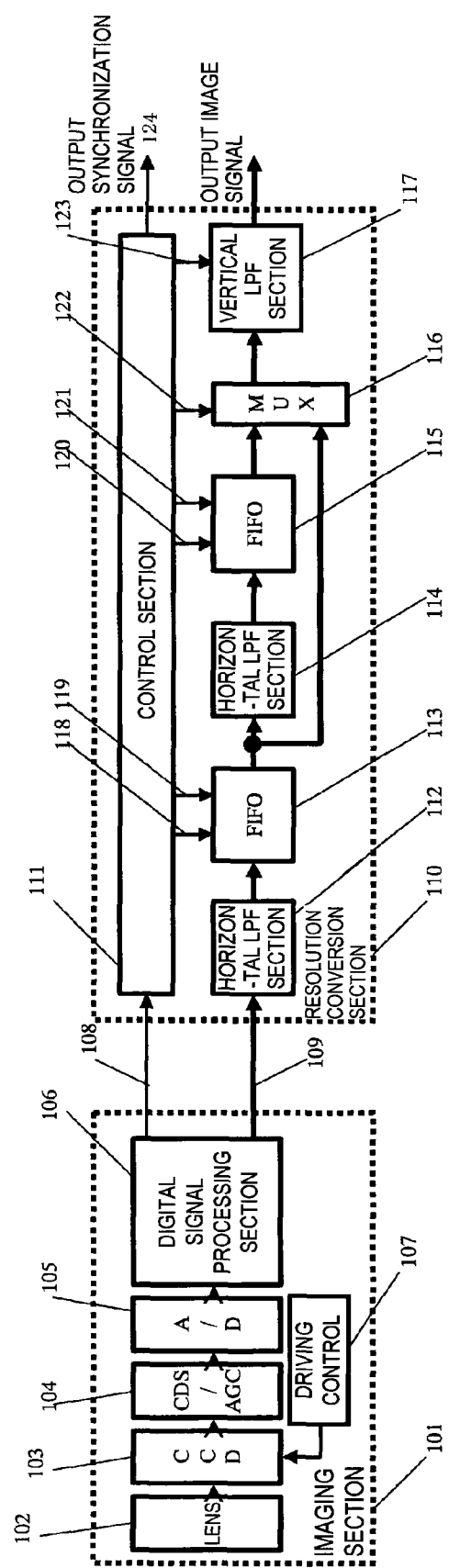
FIG. 1 shows configuration of an imaging apparatus in the first embodiment of the present invention.

101 imaging section
110 resolution conversion section
1001 encoding section
1004 network communication section

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto.

An imaging apparatus of the present invention comprises an imaging section that images a subject using an imaging device and generates an image signal and a resolution conversion section that converts a resolution of the image signal captured by the imaging section and outputs the converted image signal, in which the resolution conversion section reduces the image inputted from the imaging section to a plurality of size-reduced images of different sizes and outputs an embedded image in which the plurality of size-reduced images of different sizes are embedded in the input image size from the imaging section. With this configuration, a plurality of images of different sizes can be outputted at the same time, and a plurality of images with different resolutions can be outputted.

Also, a plurality of embedded regions may be set side by side in said input image size for embedment of the respective size-reduced images of different sizes. The resolution conversion section may output the embedded image in which the plurality of size-reduced images of different sizes are embedded in the plurality of embedded regions by generating the plurality of size-reduced images of different sizes through execution of size-reduction processing of the input image in plural stages and by sequentially outputting signals of the plurality of size-reduced images of different sizes. This configuration can suitably generates the embedded image of the present invention which enables output of a plurality of images with different resolutions at the same time.

Also, the resolution conversion section may carry out switching between an output of the embedded image and an output of an original image whose size is that of the image inputted from the imaging section, and may output additional information indicating which of the embedded image and the original image is outputted in addition to image information.

This configuration is suitable for a case where the resolution conversion section outputs the embedded image and the original image alternately or at random. Even in such a case, the image signal receiving side can determine whether the output signal is the embedded image or the original image. Thereby, the image signal receiving side can determine whether taking-out of a size-reduced image from the embedded image need to be performed or not.

The imaging apparatus may comprise a compression encoding section that is inputted with the image from the resolution conversion section, carries out compression encoding, and outputs compressed image information and a network communication section that outputs the compressed image information from the compression encoding section to a communication network. The compression encoding section may take out the plurality of size-reduced images from the embedded image from the resolution conversion section and performs encoding on the plurality of size-reduced images.

With this configuration, compression encoding and output to the network of the plurality of size-reduced images become possible at the same frame rate as an imaging frame rate of the imaging section.

Also, the compression encoding section may discriminate input images using the additional information added to the image from the resolution conversion section. The compression encoding section may determine whether the taking-out processing of the size-reduced image should be carried out or not based on a discrimination result. And the compression encoding section may execute encoding after the taking-out processing if the taking-out processing is carried out or may execute encoding of the input image if the taking-out processing is not carried out.

With this configuration, when the resolution conversion section alternately outputs the embedded image and the original image, the compression encoding and output to the network can be executed to the plurality of size-reduced images and the original image at the frame rate half of the imaging frame rate of the imaging section.

Moreover, in the course of taking-out and encoding of images of the plurality of sizes from the embedded image, the compression encoding section may use an encoding result of an image of a certain size to adjust an encoding parameter in encoding of an image of another size.

This configuration is suitable when the data size after encoding should fall within a determined range for each image size. With this configuration, on the basis of the relation between a quantization parameter in encoding of the certain image size and a data size after the encoding, the quantization parameter for another image size can be adjusted. Thereby, a probability that the data size falls within the determined range can be improved.

Moreover, the compression encoding section may encode in order from an image of a small size when encoding the plurality of images of different sizes.

This configuration is suitable for a case where the data size after encoding is required to fall within a range determined for each image size. By starting encoding from a small size, with respect to a large image size which would take time for processing, re-encoding processing for making the image size fall within a determined data-size range can be reduced. Thereby, a processing time in encoding can be reduced.

Moreover, the compression encoding section may change a frame rate for encoding for each image size. With this configuration, encoding with the image size in conformity with a display terminal connected to the imaging apparatus through the network is made possible. Also, by encoding a small image size at a high frame rate and by encoding a large image size at a low frame rate, reduction of an encoding processing load and reduction of an output data amount are made possible.

Moreover, the compression encoding section can handle a plurality of encoding methods, and an encoding method may be selectable according to an image size. With this configuration, encoding in an encoding method according or conforming to the display terminal connected to the imaging apparatus through the network is made possible.

The present invention is not limited to the above-mentioned aspect of the imaging apparatus. Another aspect of the present invention is an image processing method which carries out resolution conversion of the above-mentioned imaging apparatus, for example. Various features described in relation to the imaging apparatus may also be applied to the image processing method.

An embodiment of the present invention will be described below referring to the attached drawings.

First Embodiment

Figure 2:
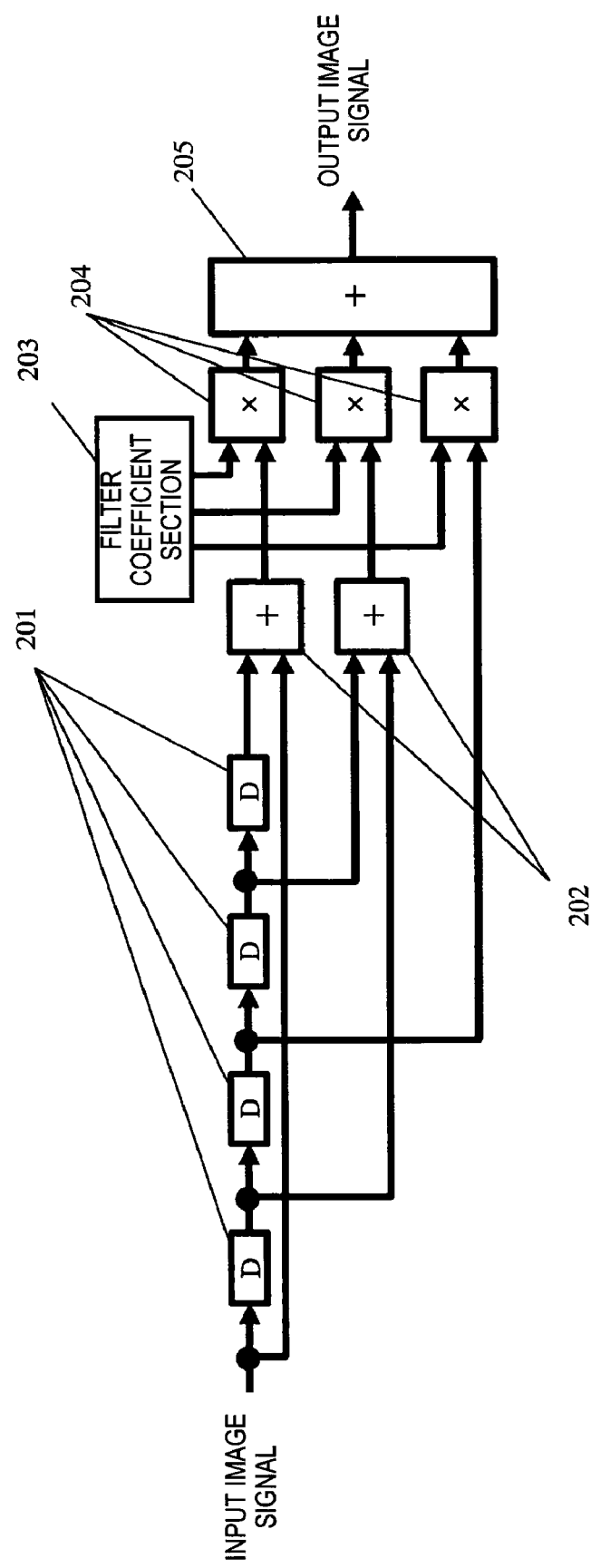
FIG. 2 shows configuration of a horizontal LPF section of the imaging apparatus in the first embodiment of the present invention.
Figure 3:
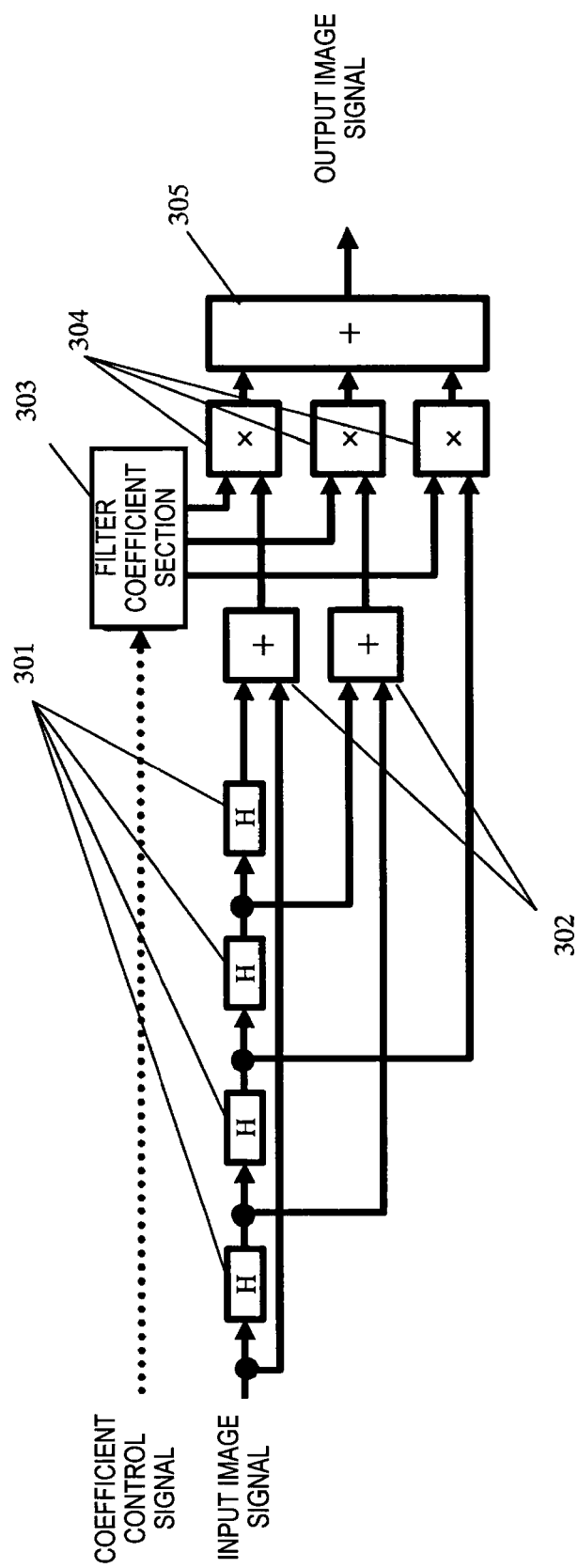
FIG. 3 shows configuration of a vertical LPF section of the imaging apparatus in the first embodiment of the present invention.
Figure 4:
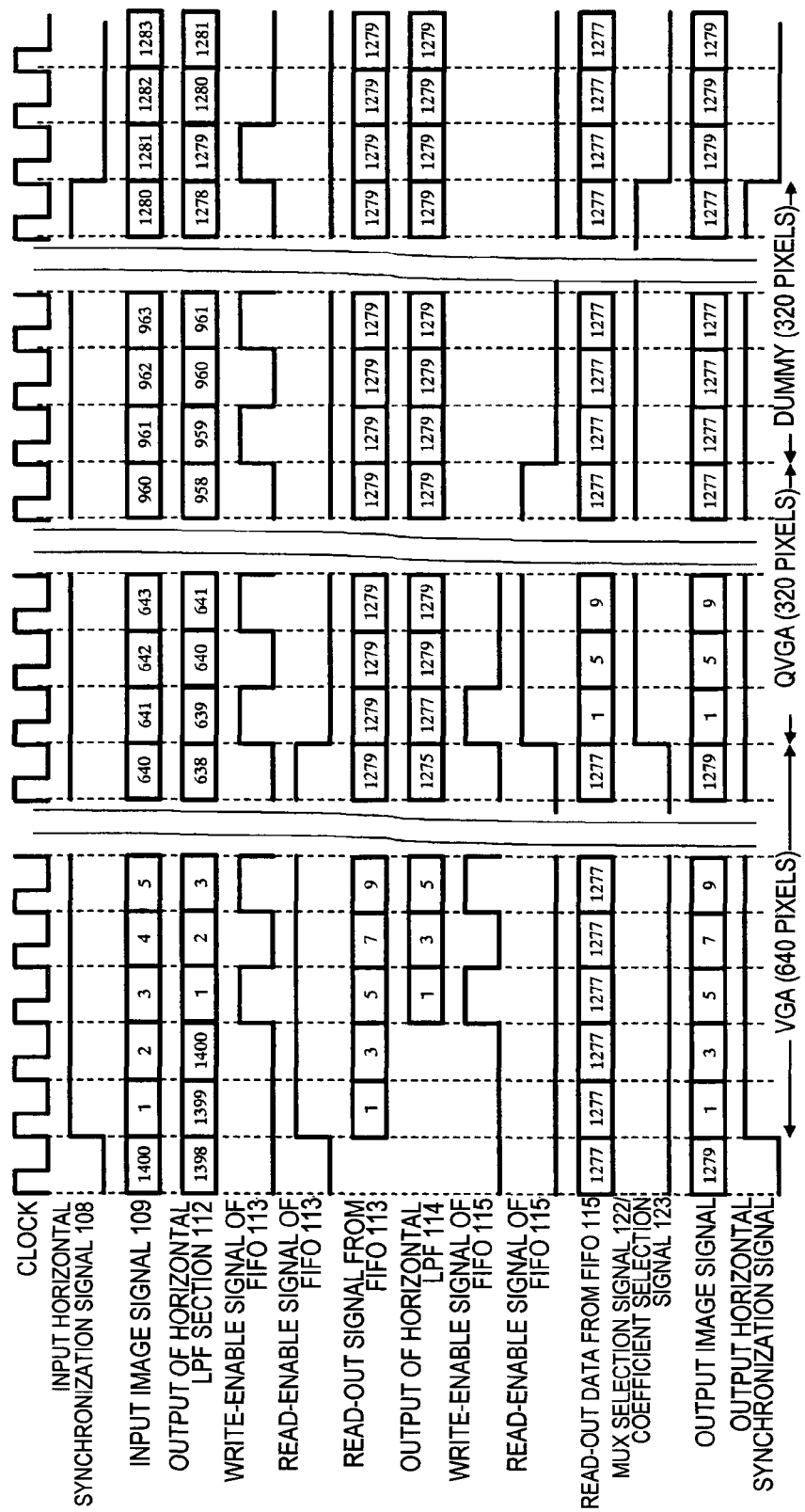
FIG. 4 illustrates an operation in horizontal processing of a resolution conversion section of the imaging apparatus in the first embodiment of the present invention.
Figure 5:
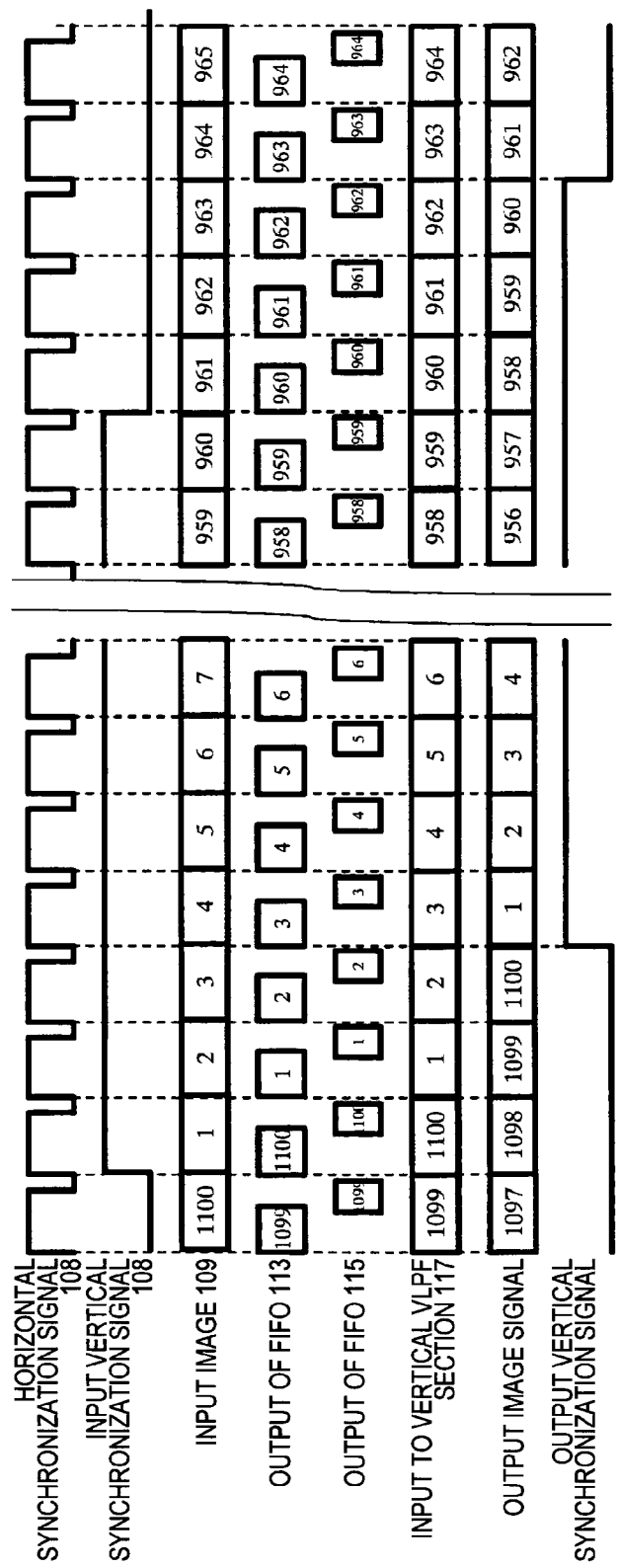
FIG. 5 illustrates an operation in vertical processing of the resolution conversion section of the imaging apparatus in the first embodiment of the present invention.
Figure 6A:
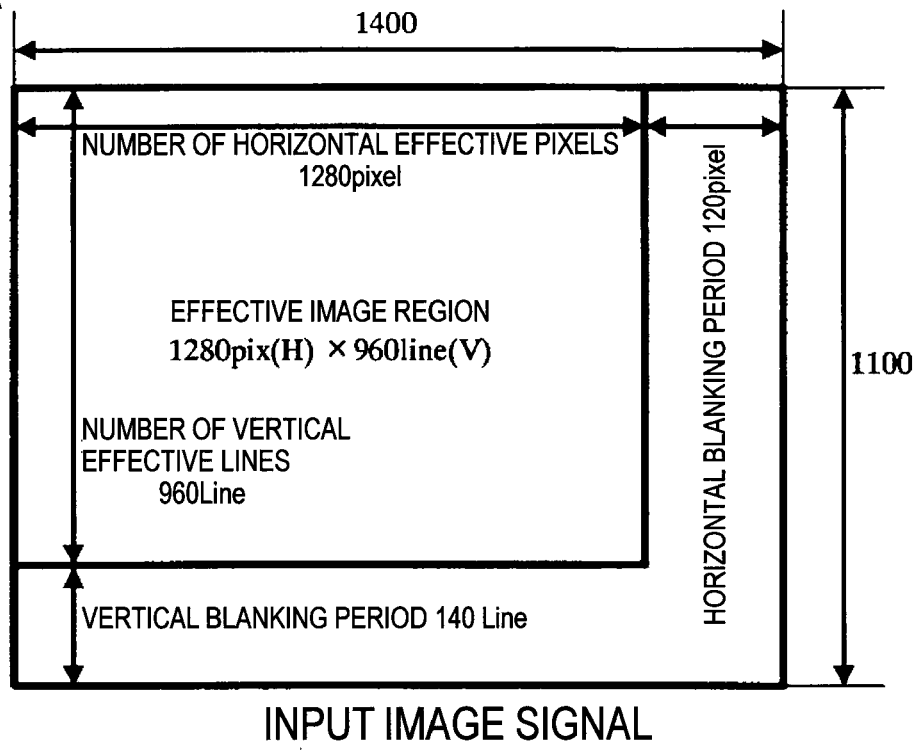
FIG. 6A illustrates an input image of the resolution conversion section of the imaging apparatus in the first embodiment of the present invention.
Figure 6B:
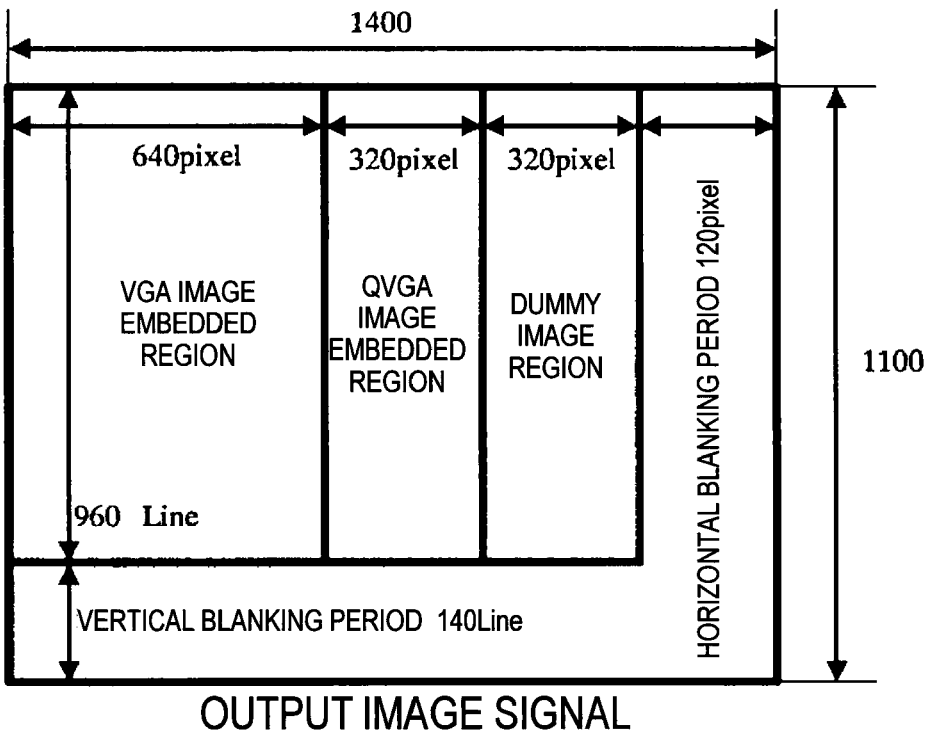
FIG. 6B illustrates an output image of the resolution conversion section of the imaging apparatus in the first embodiment of the present invention.

An imaging apparatus of a first embodiment of the present invention will be described using FIGS. 1 to 6. FIG. 1 shows configuration of the imaging apparatus of this embodiment. FIG. 2 shows configuration of a horizontal LPF section and FIG. 3 shows configuration of a vertical LPF section. FIG. 4 shows an operation in horizontal processing of a resolution conversion section and FIG. 5 shows an operation of vertical processing of the resolution conversion section. FIGS. 6A and 6B show an input image and an output image of the resolution conversion section.

As shown in FIG. 1, the imaging apparatus is provided with an imaging section 101 and a resolution conversion section 110. The imaging section 101 photographs a subject with an imaging device and generates an image signal. The resolution conversion section 110 converts a resolution of the image signal captured by the imaging section 101 and outputs a converted image signal. The imaging section 101 is provided with a lens 102, a CCD 103, a CDS/AGC section 104, an A/D section 105, a digital signal processing section 106, and a driving control section 107. The resolution conversion section 110 is provided with a control section 111, the first horizontal LPF section 112, the first FIFO section 113, the second horizontal LPF section 114, the second FIFO section 115, a MUX section 116, and a vertical LPF section 117.

In FIG. 1, in the imaging section 101, light passed through the lens 102 is photoelectrically converted by the CCD 103, and an analog image signal is generated. The CDS/AGC section 104 performs CDS (correlate double sampling) and gain control on the image signal. The A/D section 105 converts the image signal from the analog signal to a digital signal so that a digital image signal is generated. The digital signal processing section 106 carries out known camera signal processing such as white balance control, gamma conversion and the like, and the input signal is converted to an image signal 109 of a brightness signal (Y) and a color-difference signal (Cb, Cr). The image signal 109 is outputted with a synchronization signal 108. The driving control section 107 controls driving of the CCD 103.

The horizontal LPF section 112 of the resolution conversion section 110 is inputted with the image signal 109 generated by the imaging section 101. Low-pass filter processing in the horizontal direction is performed on the image signal at the horizontal LPF section 112 and the processed signal is written in the FIFO section 113. The horizontal LPF section 114 is inputted with the signal read out of the FIFO section 113. The low-pass filter processing in the horizontal direction is carried out at the horizontal LPF section 114, and the processed signal is written in the FIFO section 115. Thu MUX section 116 is inputted with the signal read out of the FIFO section 115 and the signal read out of the FIFO section 113. Either of the signals is selected at the MUX section 116 and the selected signal is inputted to the vertical LPF section 117. The vertical LPF section 117 carries out the low-pass filter processing in the vertical direction, and the output image signal is outputted.

The control section 111 generates a write-enable signal 118 for writing in the FIFO section 113, a read-enable signal 119 for reading out from the FIFO section 113, a write-enable signal 120 for writing in the FIFO section 115, a read-enable signal 121 for reading out from the FIFO section 115, a MUX selection signal 122 (select signal) to the MUX section 116, and a filter coefficient selection signal 123 to the vertical LPF section 117, from the inputted synchronization signal 108. The control section 111 also generates an output synchronization signal 124. These control signals are outputted to the respective components.

As shown in FIG. 2, the horizontal LPF section 112 and the horizontal LPF section 114 perform delay processing on the input image signal using four flip-flops 201, and create signals of 1-clock delay, 2-clock delay, 3-clock delay, and 4-clock delay. The input image signal and the 4-clock delay signal are added by an adder 202. Also, the 1-clock delay signal and the 3-clock delay signal are added by another adder 202. An output from each of the adders 202 is multiplied at a multiplier 204 by a filter coefficient outputted from a filter coefficient section 203 and the multiplied signal is outputted to an adder 205. The 2-clock delay signal is also multiplied at the multiplier 204 by the filter coefficient outputted from a filter coefficient section 303 and outputted to the adder 205. The adder 205 adds the inputted three signals together and outputs an output image signal. Thus, the horizontal low-pass filter processing is carried out.

As shown in FIG. 3, the vertical LPF section 117 performs delay processing on the input image signal using four line memories 301, and signals of l-line delay, 2-line delay, 3-line delay, and 4-line delay are generated. The input image signal and the 4-line delay signal are added by an adder 302. Also, the l-line delay signal and the 3-line delay signal are added by another adder 302. An output of each of the adders 302 is multiplied at a multiplier 304 by a filter coefficient outputted from a filter coefficient section 303 and the multiplied signal is outputted to the adder 305. The 2-line delay signal is also multiplied at the multiplier 304 by the filter coefficient outputted from the filter coefficient section 303 and outputted to the adder 305. The adder 305 adds the inputted three signals together and outputs an output image signal. Thus, the vertical low-pass filter processing is carried out. At the filter coefficient section 303, it is possible to change the filter coefficient to be outputted according to an inputted coefficient control signal.

Next, using FIGS. 4 and 5, an operation of the imaging apparatus will be described. In this example, from an input image in FIG. 6A, an output image in FIG. 6B is generated.

Explaining an operation in the horizontal direction, as shown in FIG. 4, the number of horizontal effective pixels of the input image is 1280, and an output of the horizontal LPF section 112 is delayed by 2 clocks with respect to the input image. The control signal 111 enables the write-enable signal 118 to the FIFO section for each clock from the time set in consideration with the delay. Thereby, 640 signals in the horizontal direction are written in the FIFO section 113. At the same time, the control signal 111 enables the read-enable signal 119 to the FIFO section 113 at the same timing as the input horizontal synchronization signal and enables it for 640 clocks. Thereby, the 640 pieces of data written in the previous line are read out.

The horizontal LPF section 114 is inputted with the signal read out of the FIFO section 113. The horizontal LPF section 114 outputs a signal with 2-clock delay. The control signal 111 enables the write-enable signal 121 to the FIFO section 115 for each clock from the time set in consideration of the delay. Thereby, 320 signals in the horizontal direction are written in the FIFO section 115. Also, the control section 111 enables the read-enable signal 121 of the FIFO section 115 for 320 clocks from the time when the read-enable signal of the FIFO section is disabled. Thereby, the control section 111 reads out the 320 signals written in this line from the FIFO section 115.

Also, the control section 111 controls the MUX section 116 by outputting the MUX selection signal 122 to the MUX section 116. The MUX selection signal 122 is a signal for controlling the MUX section 116 so that a signal from the FIFO section 113 is selected while the read-enable of the FIFO section 113 is enabled and a signal from the FIFO section 115 is selected while the read-enable signal of the FIFO section 115 is enabled. The MUX section 116 selects and outputs a signal according to the MUX selection signal 122. The control section 111 outputs the same signal as the MUX selection signal 122 as the coefficient selection signal 123 to the vertical LPF section 117. According to the coefficient selection signal 123, the vertical LPF section 117 applies a filter for ½ skipping to the image signal while the signal from the FIFO section 113 is inputted and applies a filter for ¼ skipping to the image signal while the signal from the FIFO section 115 is inputted.

By the above processing, the skipped image signal of 640 pixels and the further skipped image signal of 320 pixels are arranged continuously in the horizontal direction.

As an operation in the vertical direction, as shown in FIG. 5, a signal is delayed by 1 line due to writing and reading out with respect to the FIFO section 113. Also, the signal is delayed by 2 lines by processing of the vertical LPF section 117. As a result, a signal is outputted with 3-line delay in total. Then, the control section 111 generates a vertical synchronization signal delayed by 3 lines with respect to the input vertical synchronization signal. This signal is generated as the vertical synchronization signal 124 and outputted from the resolution conversion section 110.

According to the first embodiment as above, the output image in FIG. 6B is generated from the input image in FIG. 6A. The input image is the image with 1280 pixels in the horizontal direction and 960 lines in the vertical direction, that is, a 4VGA image. The output image is an image in which an image with 640 pixels in the horizontal direction and 480 lines in the vertical direction (VGA image) and an image with 320 pixels in the horizontal direction and 240 lines in the vertical direction (QVGA image) are embedded (or inserted). The two size-reduced images are embedded in the size of the input image. Such characteristic image of the present invention is called "embedded image (inserted image)".

The embedded image in the illustrated example will be described in more detail. An effective image region (input image size) of the input image is a region with 1280 pixels in the horizontal direction and 960 lines in the vertical direction. In this effective image region, a VGA-image embedded region and a QVGA-image embedded region are set side by side. The width of the VGA-image embedded region is 640 pixels and the width of the QVGA-image embedded region is 320 pixels. The remaining region is a dummy region, whose width is 320 pixels. The width of each region in the vertical direction is 960 lines. The VGA image may be incorporated in the VGA-image embedded region by every two lines, while the QVGA image may be incorporated in the QVGA-image embedded region by every four lines. Thus, the VGA image signal and the QVGA image are embedded in the respective embedded regions in the output image signal.

The first embodiment of the present invention has been described above. According to this embodiment, the resolution conversion section outputs an image in the form of the embedded image as above. Thereby, a plurality of images of different sizes can be outputted at a time and therefore, a plurality of images with different resolutions can be outputted at a time. Images with a plurality of resolutions can be outputted at an input frame rate.

Also, in this embodiment, a plurality of embedded regions are set side by side in the input image size for embodiment of the respective size-reduced images of different sizes. The resolution conversion section 110 generates the plurality of size-reduced images of different sizes by performing size-reduction processing, or more specifically skipping processing, in plural stages on the input image, and sequentially outputs the signal of the plurality of size-reduction images of different sizes. Thereby, the resolution conversion section 110 outputs the embedded image in which the plurality of size-reduced images of different sizes are embedded in the plurality of embedded regions. This configuration can preferably generate the embedded image of the present invention that enables output of the plurality of images with different resolutions at the same time.

Second Embodiment

Figure 7:
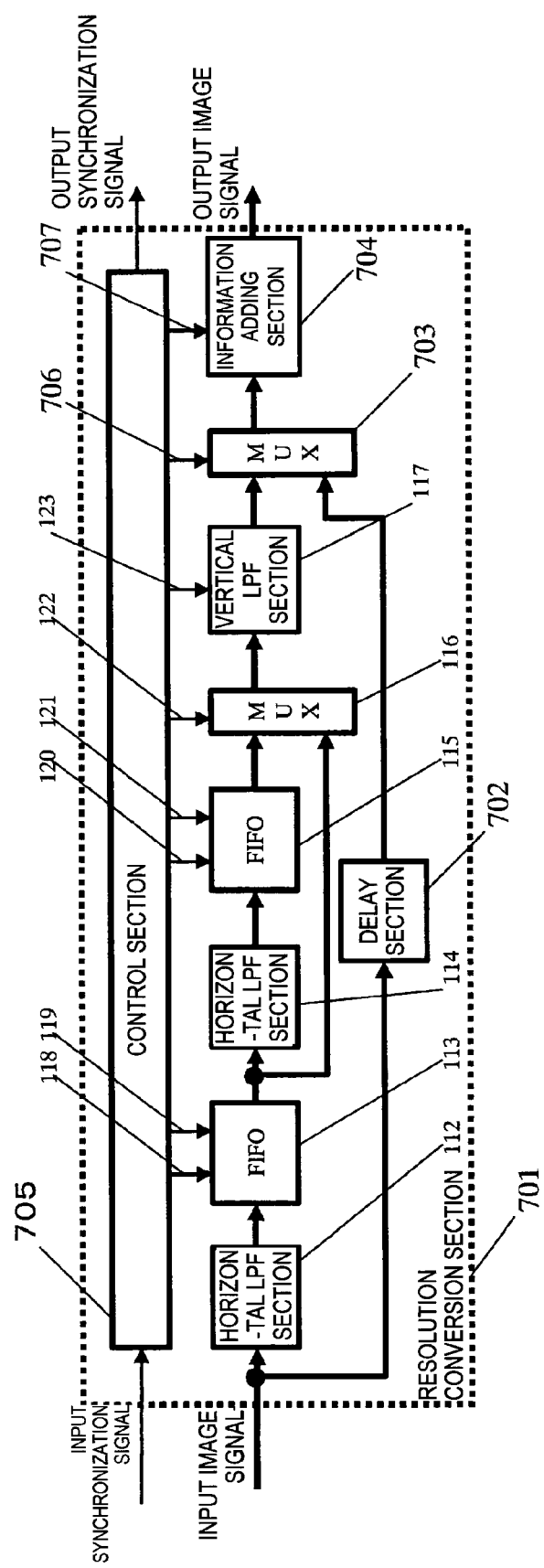
FIG. 7 shows configuration of a resolution conversion section of an imaging apparatus in the second embodiment of the present invention.
Figure 8:
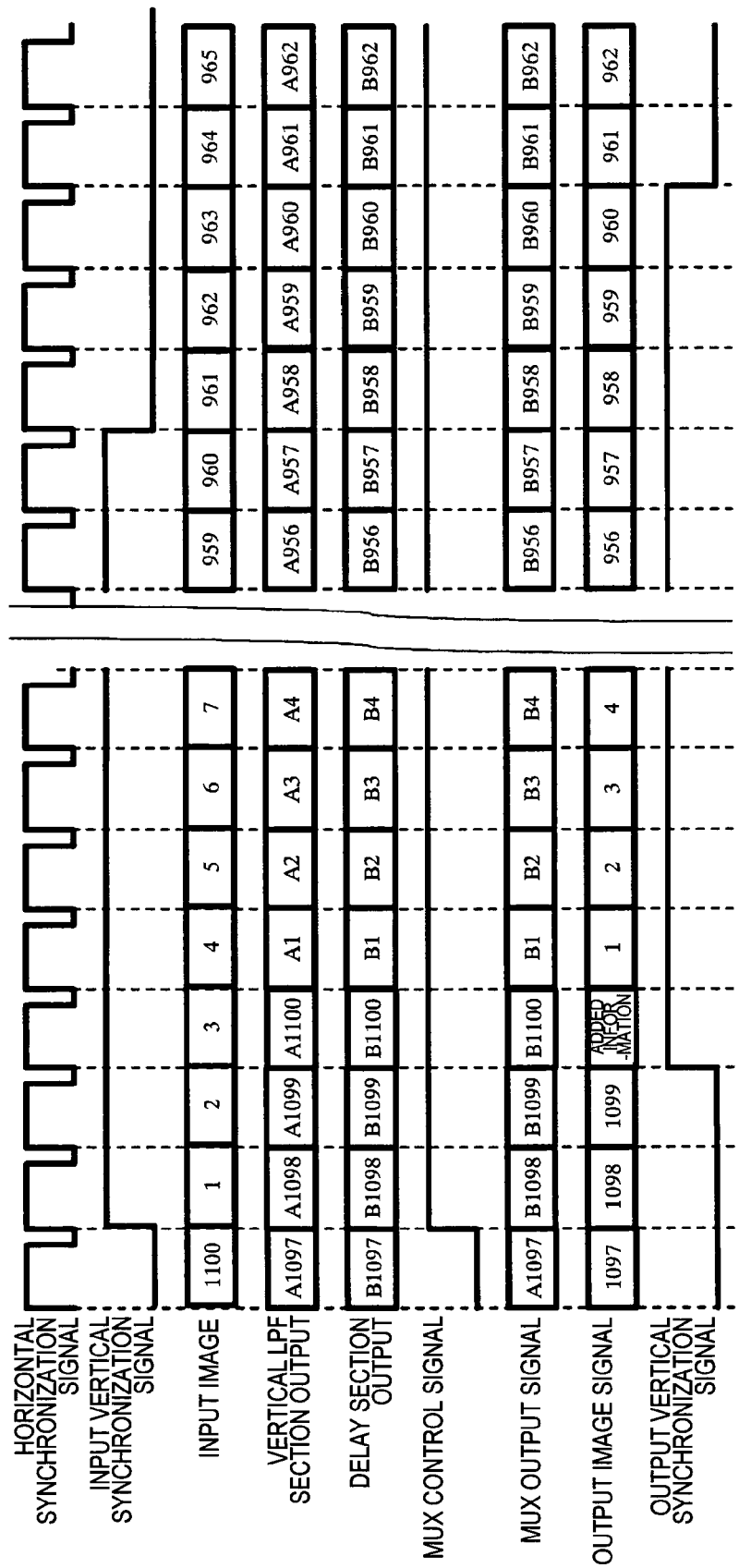
FIG. 8 illustrates an operation of the resolution conversion section of the imaging apparatus in the second embodiment of the present invention.
Figure 9A:
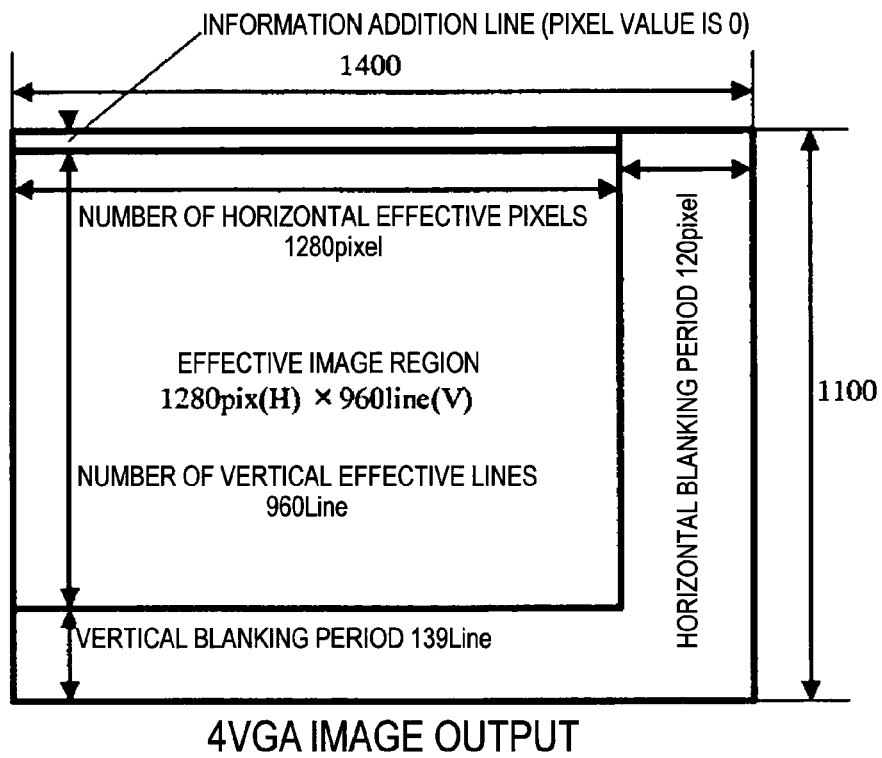
FIG. 9A illustrates an output image when an original image is selected in the second embodiment of the present invention.
Figure 9B:
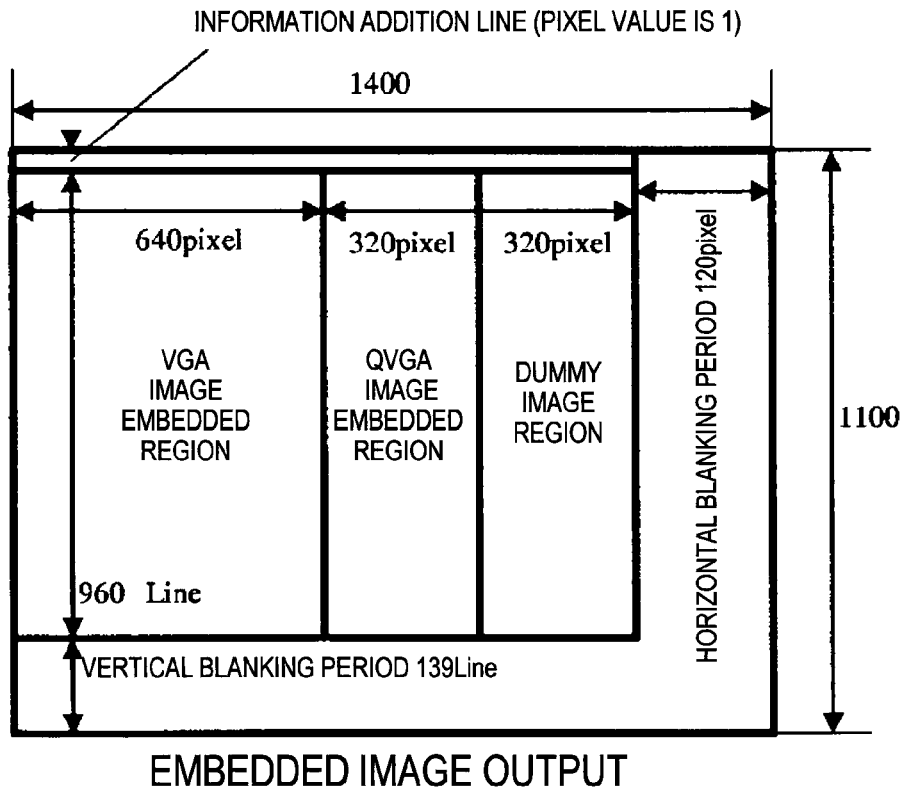
FIG. 9B illustrates an output image when an embedded image is selected in the second embodiment of the present invention.

Next, a second embodiment will be described using FIGS. 7, 8, and 9. FIG. 7 shows configuration of the resolution conversion section of the imaging apparatus of this embodiment. FIG. 8 shows an operation of the resolution conversion section. FIGS. 9A and 9B show output images in this embodiment. In the explanation below, the explanation on the matter common to the above-mentioned embodiment is omitted.

As a difference from the resolution conversion section 110 in FIG. 1, the resolution conversion section 701 in FIG. 7 additionally has a delay section 702, a MUX section 703, and an information adding section 704. The delay section 702 is inputted with an input image signal, and the delay section 702 delays the input image signal and outputs it to the MUX section 703.

The MUX section 703 is inputted with the output of the vertical LPF section 117 and the output of the delay section 702. The former is the embedded image in the first embodiment, while the latter is an original image before resolution conversion. The MUX section 703 selects and outputs either of the signals according to a MUX selection signal 706 from a control section 705. The control section 705 may have the MUX section 703 alternately output the embedded image and the original image. Also, the control section 705 may have the MUX section 703 output the embedded image and the original image at random.

The information adding section 704 is inputted with the output of the MUX section 703. The information adding section 704 adds additional information to the image signal and outputs it according to an information addition instruction signal 707 from the control section 705. The additional information is information to discriminate the image selected at the MUX section 703, that is, information to discriminate between the embedded image and the original image. Also, the control section 705 has a function for controlling the above-mentioned MUX section 703 and the information adding section 704 in addition to the function of the control section 111 in the first embodiment.

Next, referring to FIG. 8, an operation of the imaging apparatus of this embodiment will be described. The operation from inputting the input image signal to the horizontal LPF section 112 till outputting the signal from the vertical LPF section 117 is the same as described in the first embodiment. An output signal of the vertical LPF 117 is delayed by 3 lines from the input signal. At the same time, the input image signal is delayed by 3 lines by the delay section 702 and inputted into the MUX section 703.

The control section 705 switches the MUX selection signal 706 to the image to be outputted at a frame switching timing. Thereby, the MUX section 703 selects the original image of the input image as it is or the embedded image in which the size-reduction images are embedded. FIG. 8 shows an operation when output of the original image from the delay section 702 is selected at the beginning of a frame.

Also, the information adding section 704 adds the additional information to the output signal of the MUX section 703 according to the information addition instruction signal 707 from the control section 705. The additional information is, as mentioned above, information on which of the embedded image from the vertical LPF 117 and the original image from the delay section 702 is outputted. The additional information is added to the 1100-th line. For example, if the output signal from the delay section 702 is outputted, all the pixel values on the 1100 line are made 0 (zero). When the output signal from the vertical LPF section 117 is outputted, all the pixel values are made 1 (–).

The additional information may be any information that can discriminate between two images. The additional information may be other values. Also, the additional information does not have to be added to all the pixels on the line as in the above-mentioned example.

FIGS. 9A and 9B show output images of the resolution conversion section 701. In this embodiment, an image of either of FIG. 9A and FIG. 9B is outputted. FIG. 9A is an original image of the input image as it is. However, a pixel value 0 is added to the information addition line as the additional information. FIG. 9B is an embedded image, and the pixel value 1 is added to the information addition line as the additional information.

The second embodiment of the present invention as mentioned above is suitable for a case where the imaging apparatus outputs the original image or the embedded image alternately or at random. Even in this case, the image signal receiving side can determine whether the output signal is the embedded image or the original image (input image). Therefore, the image signal receiving side can determine whether the size-reduced image needs to be taken out of the embedded image or not.

Third Embodiment

Figure 10:
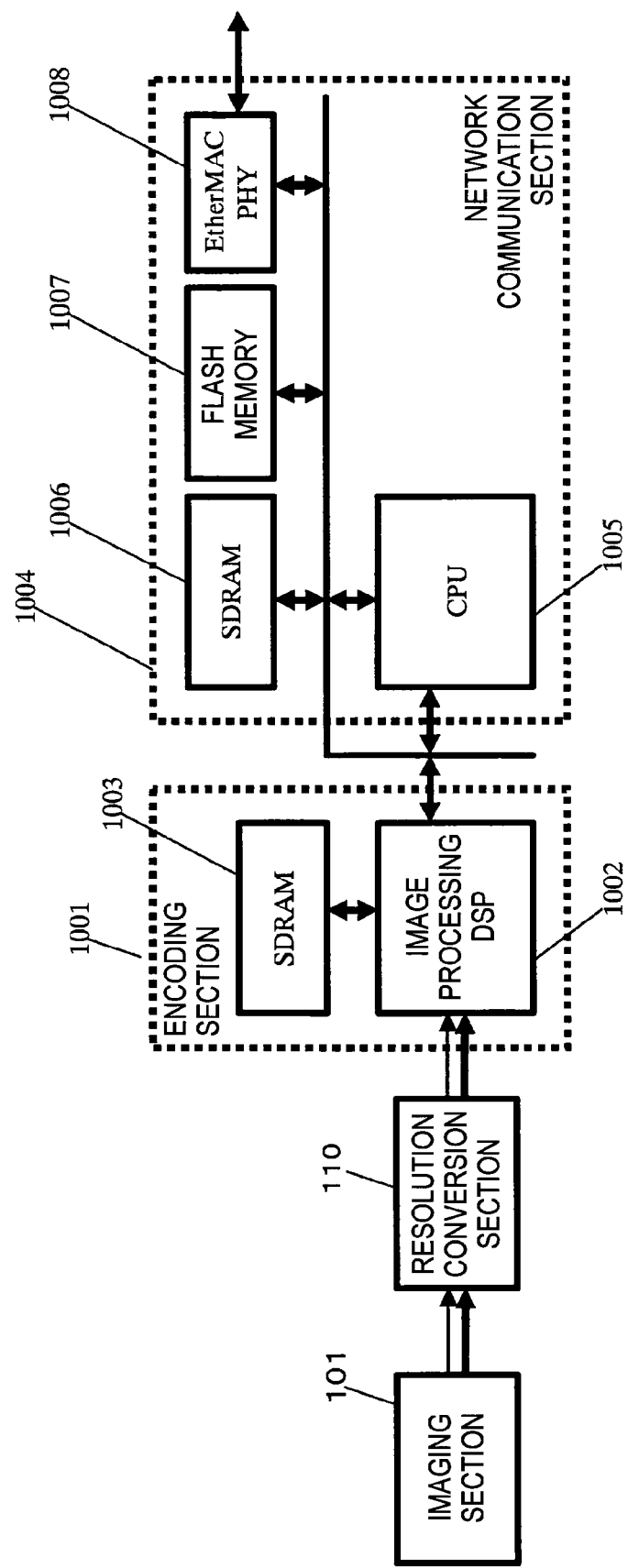
FIG. 10 shows configuration of an imaging apparatus in the third embodiment of the present invention.
Figure 11:
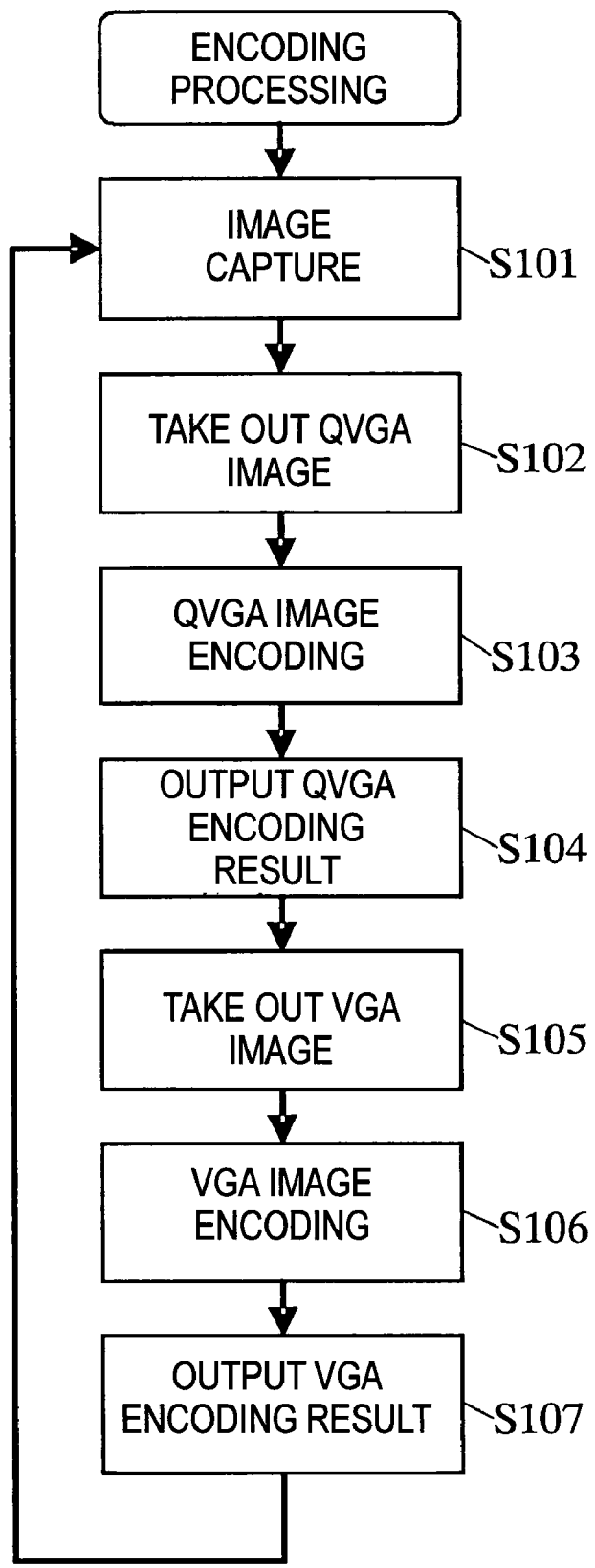
FIG. 11 is a flowchart illustrating an operation of an encoding section in the third embodiment of the present invention.

Next, a third embodiment of the present invention will be described using FIGS. 10 and 11. FIG. 10 shows configuration of an imaging apparatus of this embodiment, and FIG. 11 shows an operation of an encoding section in this embodiment. In the following embodiment, the explanation on the matter common to the above-mentioned embodiments are omitted.

In FIG. 10, an encoding section 1001 and a network communication section 1004 are added to the configuration of FIG. 1. The configuration of the imaging section 101 and the resolution conversion section 110 is the same as those in the first embodiment shown in FIG. 1. The encoding section 1001 is inputted with an image from the resolution conversion section 110, carries out compression encoding, and outputs compressed image information. The network communication section 1004 outputs the compressed image information from the encoding section 1001 to the communication network.

The encoding section 1001 is constituted by an image processing DSP 1002 and a SDRAM 1003. The SDRAM 1003 is connected to a bus of the image processing DSP 1002. The network communication section 1004 is constituted by a CPU 1005, a SDRAM 1006, a FLASH memory 1007 and an Ether chip 1008 connected to a bus of the CPU 1005. The FLASH memory 1007 stores a program. The Ether chip 1008 is constituted by an Ether MAC and PHY to be connected to the Ethernet (registered trademark). The image processing DSP 1002 is also connected to the bus of the CPU 1005.

Next, an operation of the imaging apparatus of this embodiment will be described. The operation of the imaging section 101 and the resolution conversion section 110 is the same as in the first embodiment. The resolution conversion section 110 converts an image signal from the imaging apparatus 101 to an output image in FIG. 6B and outputs the converted image. At the encoding section 1001, as shown in FIG. 11, the image is captured (S101), and a QVGA image is taken out of the image in FIG. 6B (S102). The QVGA image is a smaller size-reduced image with 320 pixels in the horizontal direction and 240 lines in the vertical direction. At Step S102, signals for 320 pixels from the 641-th pixel from the left end of the image are taken out by every four lines, thereby the QVGA image is taken out from the QVGA image embedded region. Compression encoding is performed on the taken-out QVGA image (S103) and the encoding result is outputted to the CPU 1005 (S104).

Next, a VGA image is taken out of the image in FIG. 6B (S105). The VGA image is a larger size-reduced image with 640 pixels in the horizontal direction and 480 lines in the vertical direction. At Step S105, signals for 640 pixels from the left end of the image are taken out by every two lines. Thereby, the VGA image is taken out of the VGA image embedded region. Compression encoding is performed on the taken-out VGA image (S106) and the encoding result is outputted to the CPU 1005 (S107).

The CPU 1005 reads out the encoded image signal accumulated in the SDRAM 1003 based on the encoding result received from the encoding section 1001. The CPU generates packet data according to TCP/IP or UDP/IP protocol using the SDRAM 1006 and outputs the packet data to the Ethernet (registered trademark) through the Ether chip 1008. The CPU 1005 outputs the VGA image to a user demanding the VGA image and the QVGA image to a user demanding the QVGA image.

The encoding method at the encoding section 1001 may be still image encoding such as JPEG or moving image encoding such as MPEG. The encoding method may be the same or different for the QVGA image and the VGA image. Preferably, the encoding section 1001 is configured to handle a plurality of encoding methods. And the encoding section 1001 is configured such that it can select the encoding method for each image size, and select the encoding method upon instruction by the CPU 1005. This configuration may be similarly applied to other arbitrary embodiments.

According to the third embodiment as above, the encoding section 1001 and the network communication section 1004 are provided. The encoding section 1001 takes out the plurality of size-reduced images from the embedded image from the resolution conversion section 110 and performs encoding on the plurality of size-reduced images. Thereby, the compression encoding and output to the network can be performed on the plurality of size-reduced images at the same frame rate as the imaging frame rate of the imaging section.

Also, the encoding section 1001 handles the plurality of encoding methods, and the encoding method can be selected for each image size. With this configuration, the encoding by the encoding method according or conforming to a display terminal connected to the imaging apparatus through the network is made possible.

In addition, in this embodiment, the encoding section 1001 may be configured so that the frame rate for encoding can be changed for each image size. With this configuration, the encoding in the image size according or conforming to the display terminal connected to the imaging apparatus through the network is made possible. Also, a small image size can be encoded with a high frame rate, while a large image size can be encoded at a low frame rate. Thereby, reduction of the encoding processing load and reduction of the output data amount are made possible. This configuration may be applied to other embodiments.

Fourth Embodiment

Figure 12:
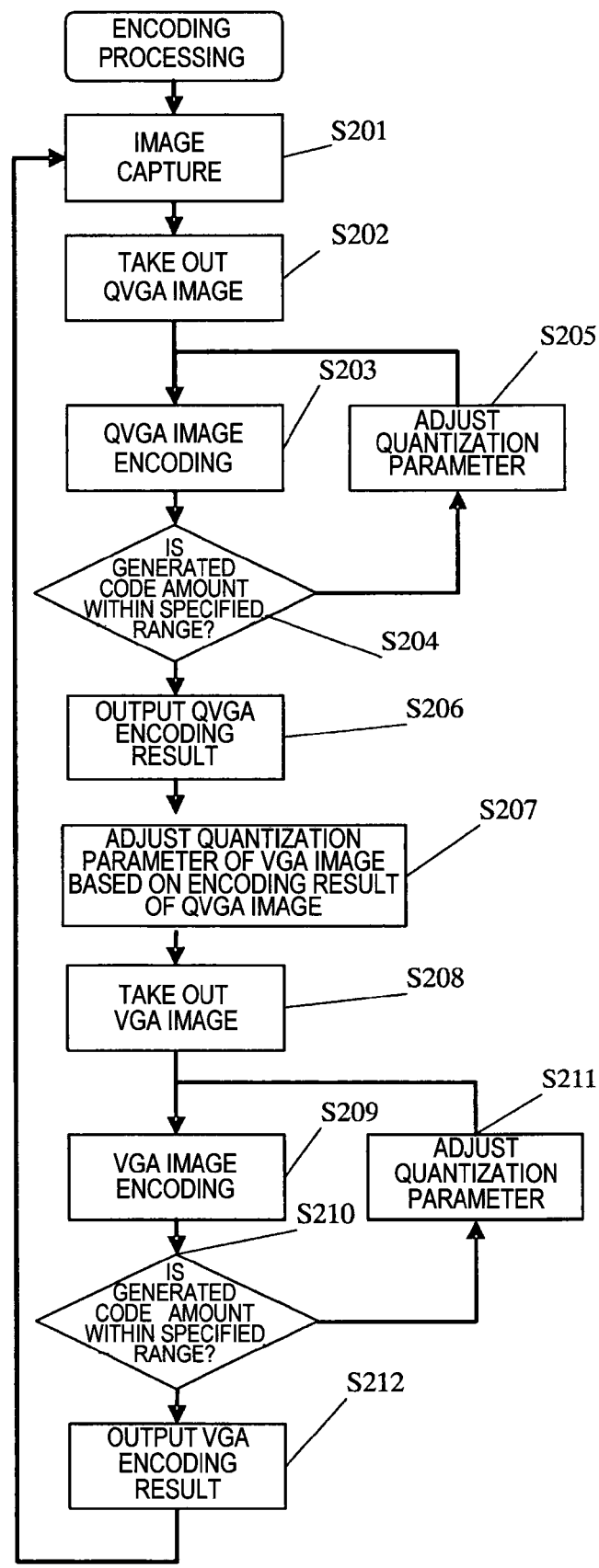
FIG. 12 is a flowchart illustrating an operation of an encoding section in the fourth embodiment of the present invention.

Next, a fourth embodiment of the present invention will be described. An imaging apparatus of this embodiment has the configuration similar to that of the third embodiment shown in FIG. 10. However, as will be described below, an encoding-parameter adjustment function suitable for compression encoding processing of the embedded image is added to the encoding section 1001. FIG. 12 shows an operation of the encoding section in this embodiment. In the explanation below, the explanation on the matter common to the above-mentioned embodiments are omitted.

The resolution conversion section 110 converts the image signal from the imaging apparatus 101 to the output image in FIG. 6B and outputs the converted image. At the encoding section 1001, as shown in FIG. 12, the image is captured (S201), and the QVGA image is taken out of the image in FIG. 6B (S202). The taking-out processing is as having been already described above. And the compression encoding of the QVGA image is carried out (S203), and determination processing is executed on whether a generated code amount as the result of encoding is within a specified range (S204). If the code amount is not within the specified range, a quantization parameter is adjusted (S205), and the QVGA image is encoded again (S203). If the code amount is within the specified range at Step S204, the encoding result is outputted to the CPU 1005 (S206).

Next, the quantization parameter for the VGA image is adjusted on the basis of the relation between the quantization parameter in encoding of the QVGA image and the generated code amount (S207). The relation between the quantization parameter of the QVGA image and the generated code amount is obtained in the course of the above-mentioned taking-out and encoding of the QVGA image. Suppose that in the encoding of the QVGA image, the code amount falls within the specified range by raising a value of quantization from the initial quantization parameter. In this case, the value of quantization to be used for encoding of the VGA is also raised before encoding of the VGA. Suppose that in the encoding of the QVGA image, the quantization parameter is lowered. In this case, the value of quantization to be used for encoding of the VGA is also lowered. Such adjustment processing of the encoding parameter is carried out at Step S207.

Next, the VGA image is taken out of the image in FIG. 6B (S208). The taking-out processing is as having been already described. And the VGA image is encoded (S209). Here, a parameter adjusted at Step S207 is used. And the determination processing is carried out on whether the generated code amount of the VGA image is within the specified range or not (S210). If the code amount is outside the specified range, the quantization parameter is adjusted (S211) and the VGA image is encoded again (S209). If the code amount is within the specified range at Step S210, the encoding result is outputted to the CPU 1005 (S212). The image signal is then outputted to the network by the network communication section 1004. The operation of the network communication section 1004 is the same as in the third embodiment.

The imaging apparatus according to the fourth embodiment of the present invention has been described above. According to this embodiment, in the course of executing taking-out and encoding of images of the plurality of sizes from the embedded image, the compression encoding section adjusts, based on the encoding result of an image of a certain size, the encoding parameter in the encoding of an image of the other size. This configuration is suitable for a case where the data size after encoding is required to fall within a range determined for each image size as in the above-mentioned example. With this configuration, on the basis of the relation between the quantization parameter in encoding of the certain image size and the data size after encoding, the quantization parameter for another image size can be adjusted. Thereby, a probability that the data size falls within the determined range can be improved.

Also, in this embodiment, the encoding section 1001 carries out encoding in order from an image of a small size when encoding the plurality of images of different sizes. This configuration is also suitable for a case where the data size after encoding needs to fall within a determined size for each image size as in this embodiment. By encoding in order from a small size, with respect to the large image size which would take processing time, re-encoding processing in order to make the image size fall within the determined data size range can be reduced. Thereby, the processing time in encoding can be reduced.

Fifth Embodiment

Figure 13:
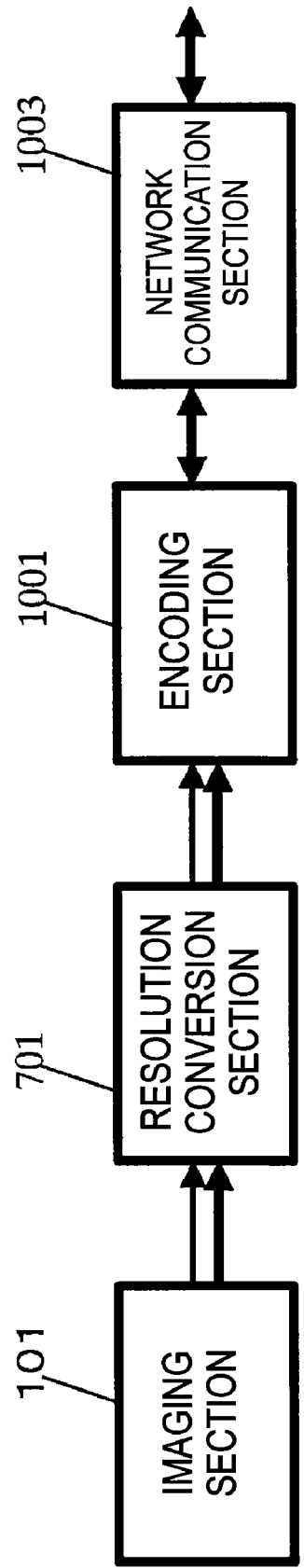
FIG. 13 shows configuration of an imaging apparatus in the fifth embodiment of the present invention.

Next, a fifth embodiment of the present invention will be described using FIGS. 13 and 14. FIG. 13 shows configuration of an imaging apparatus in this embodiment and FIG. 14 shows an operation of an encoding section.

As shown in FIG. 13, in the imaging apparatus of this embodiment, the resolution conversion section 101 in FIG. 10 is replaced by the resolution conversion section 701. The configuration of the resolution conversion section 701 is as described using FIG. 7. Also, in this embodiment, in order to process two types of images of the embedded image and the original image outputted from the resolution conversion section 701, the encoding section 1001 is configured to realize the following functions. In the explanation below, the explanation on the matter common to the above-mentioned embodiments are omitted.

An image signal from the imaging apparatus 101 is processed at the resolution conversion section 701, and an original image in FIG. 9A and an embedded image in FIG. 9B are outputted. In this embodiment, the resolution conversion section 701 alternately outputs the original image and the embedded image. That is, if an original image is outputted in a certain frame, an embedded image is outputted in the subsequent frame, and an original image is outputted in the further subsequent frame.

Figure 14:
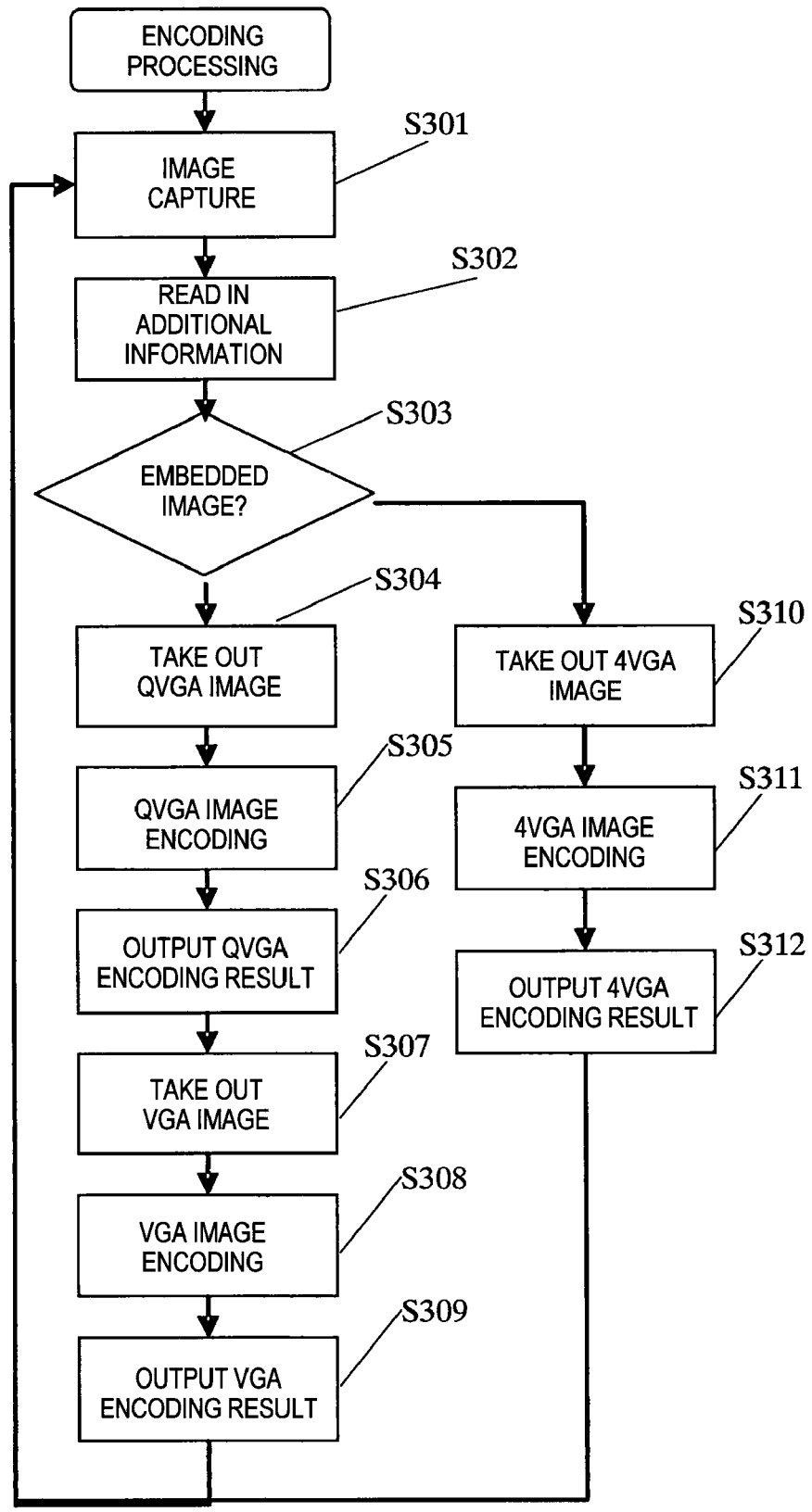
FIG. 14 is a flowchart illustrating an operation of an encoding section in the fifth embodiment of the present invention.
Figure 15:
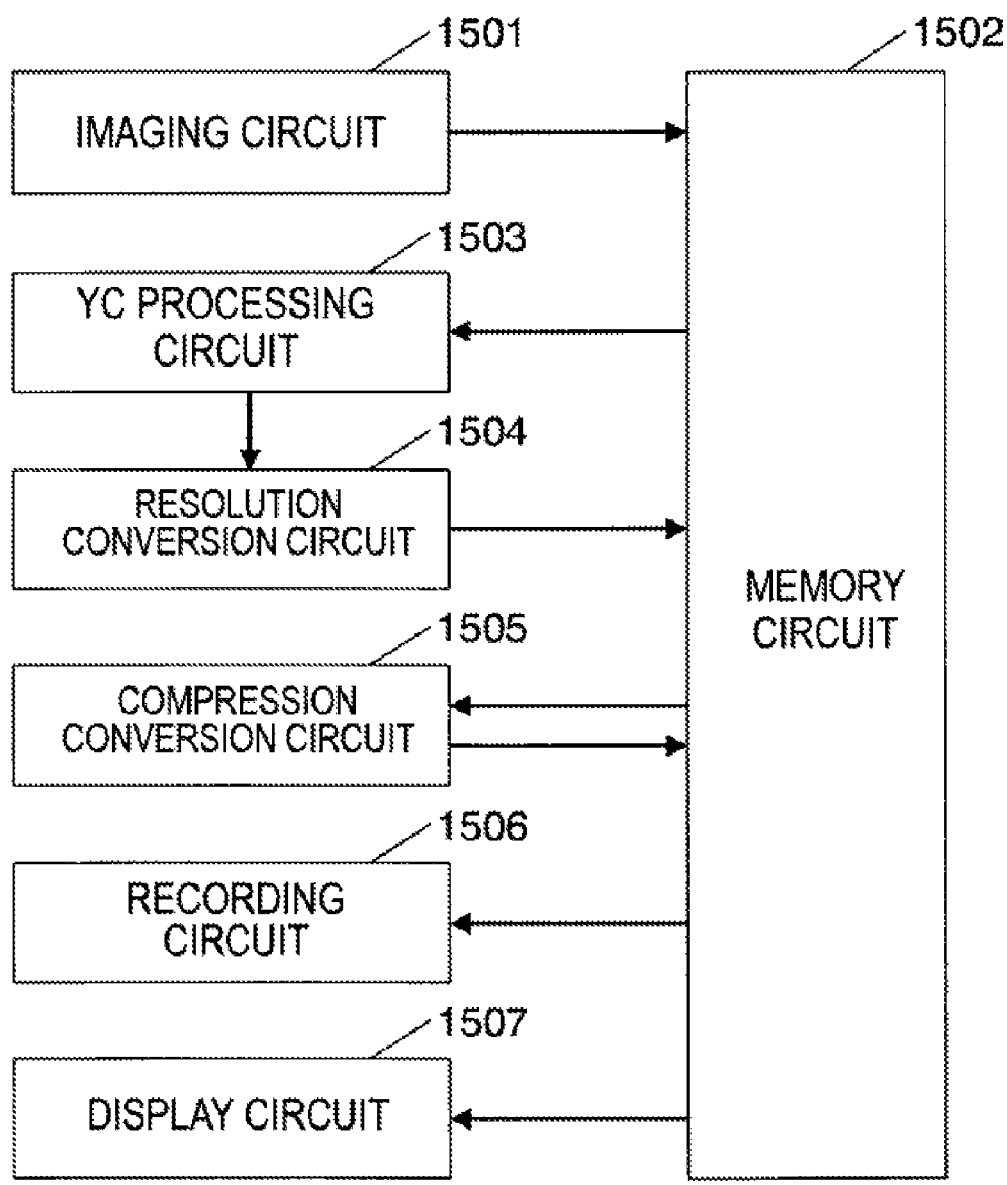
FIG. 15 shows configuration of a conventional imaging apparatus.

At the encoding section 1001, as shown in FIG. 14, the image is captured (S301) and additional information is read in (S302). The additional information is, as shown in FIGS. 9A and 9B, data of the uppermost line in the image. The encoding section 1001, based on the additional information, determines if the captured image is a 4VGA image (image with 1280 horizontal pixels and vertical lines) (FIG. 9A) or an embedded image of VGA and QVGA (FIG. 9B) (S303).

If the captured image is the embedded image, the encoding section 1001 takes out the QVGA image (320 pixels in the horizontal direction, 240 lines in the vertical direction) (S304), carries out compression encoding of the QVGA image (S305), and outputs the encoding result to the CPU 1005 (S306). Next, the encoding section 1001 takes out the VGA image (S307), carries out compression encoding of the VGA image (S308), and outputs the encoding result to the CPU 1005 (S309).

At Step S303, if the captured image is the 4VGA image, the encoding section 1001 takes out the 4VGA image (S310), carries out encoding of the 4VGA image (S311), and outputs the encoding result of the 4VGA image to the CPU 1005 (S312). The operation of the network communication section 1003 is the same as in the third embodiment. However, the communication network 1003 processes the 4VGA image in addition to the QVGA encoded image, and the VGA image. The network communication section 1003 reads out the QVGA encoded image, VGA encoded image, and 4VGA encoded image from the encoding section, outputs the 4VGA encoded image to a user demanding the 4VGA image, outputs the VGA encoded image to a user demanding the VGA image, and outputs the QVGA encoded image to a user demanding the QVGA image.

According to the fifth embodiment of the present invention as above, the encoding section 1001 discriminates the input image using the additional information added to the image from the resolution conversion section 701. The encoding section 1001 determines whether taking-out processing of the size-reduced images should be carried out or not based on the discrimination result. And if the encoding section 1001 carries out the taking-out processing, the section executes encoding of a plurality of size-reduced images after carrying out the taking-out processing, while if the section does not carry out the taking-out processing, the section encodes the input image. With this configuration, when the resolution conversion section alternately outputs the embedded image and the original image, the compression encoding and output to the network can be performed on the plurality of size-reduced images and the original image at the frame rate half of the imaging frame rate of the imaging section.

The configuration of the fourth embodiment may be incorporated in the fifth embodiment. In this case, when the embedded image is inputted to the encoding section 1001, the quantization parameter of encoding of the VGA image is adjusted based on the encoding result of the QVGA image.

While there has been described what is at present considered to be a preferred embodiment of the invention, it will be understood that various modifications and variations may be made thereto, and it is intended that appended claims cover all such modifications and variations as fall within the true spirit and scope of the invention.

INDUSTRIAL APPLICABILITY

As mentioned above, the imaging apparatus according to the present invention is useful as a camera and the like that can output images with a plurality of resolutions.

The invention claimed is:

1. An imaging apparatus comprising:
an imaging section for imaging a subject using an imaging device to generate an image signal; and
a resolution conversion section for converting a resolution of the image signal captured by said imaging section and outputting the converted image signal, wherein
a plurality of embedded regions are set in an input image size for embedment of respective size-reduced images of different sizes,
said resolution conversion section reduces the image inputted from said imaging section to a plurality of size-reduced images of different sizes obtained from a same source, and outputs an embedded image, comprising the plurality of size-reduced images of said subject and a dummy region that together have the same image-size as the input image, in which the plurality of size-reduced images of different sizes are embedded in the embedded regions respectively, wherein
said resolution conversion section outputs the embedded image in which the plurality of size-reduced images of different sizes are embedded in the plurality of embedded regions by generating the plurality of size-reduced images of different sizes through size-reduction processing of the input image in plural stages and by sequentially outputting signals of the plurality of size-reduced images of different sizes, and wherein
output of the embedded image causes output of the plurality of size-reduced images with different resolutions at the same time.

2. The imaging apparatus according to claim 1, wherein the plurality of embedded regions are set side by side in said input image size.

3. The imaging apparatus according to claim 1, wherein said resolution conversion section carries out switching between the output of the embedded image and an output of an original image whose size is that of the image inputted from said imaging section, and outputs additional information indicating which of the embedded image and the original image is outputted in addition to image information.

4. The imaging apparatus according to claim 3, further comprising:
a compression encoding section that is inputted with the image from said resolution conversion section, carries out compression encoding, and outputs compressed image information; and
a network communication section that outputs the compressed image information from said compression encoding section to a communication network, wherein
said compression encoding section discriminates input images using the additional information added to the image from said resolution conversion section, determines whether taking-out processing of the size-reduced images should be carried out or not based on a discrimination result, and executes encoding after the taking-out processing if the taking-out processing is carried out or executes encoding of the input image if the taking-out processing is not carried out.

5. The imaging apparatus according to claim 4, wherein in the course of taking-out and encoding of images of the plurality of sizes from the embedded image, said compression encoding section uses an encoding result of an image of a certain size to adjust an encoding parameter in encoding of an image of another size.

6. The imaging apparatus according to claim 5, wherein said compression encoding section encodes in order from an image of a small size when encoding the plurality of images of different sizes.

7. The imaging apparatus according to claim 4, wherein said compression encoding section changes a frame rate for encoding for each image size.

8. The imaging apparatus according to claim 4, wherein said compression encoding section handles a plurality of encoding methods which are selectable according to the image size.

9. The imaging apparatus according to claim 1, further comprising:
a compression encoding section that is inputted with the image from said resolution conversion section, carries out compression encoding, and outputs compressed image information; and
a network communication section that outputs the compressed image information from said compression encoding section to a communication network, wherein said compression encoding section takes out the plurality of size-reduced images from the embedded image from said resolution conversion section and performs encoding on the plurality of size-reduced images.

10. The imaging apparatus according to claim 9, wherein in the course of taking-out and encoding of images of the plurality of sizes from the embedded image, said compression encoding section uses an encoding result of an image of a certain size to adjust an encoding parameter in encoding of an image of another size.

11. The imaging apparatus according to claim 10, wherein said compression encoding section encodes in order from an image of a small size when encoding the plurality of images of different sizes.

12. The imaging apparatus according to claim 9, wherein said compression encoding section changes a frame rate for encoding for each image size.

13. The imaging apparatus according to claim 9, wherein said compression encoding section handles a plurality of encoding methods which are selectable according to the image size.

14. The imaging apparatus of claim 1, wherein the input image size is associated with the resolution of the image signal.

15. An image processing method for converting a resolution of an input image signal and generating a converted image signal, comprising:

reducing an input image of a subject to a plurality of size-reduced images of said subject and that are of different sizes and obtained from a same source; and generating an embedded image, comprising the plurality of size-reduced images of said subject and a dummy region that together have the same image-size as the input image, in which the plurality of size-reduced images of different sizes are embedded, wherein a plurality of embedded regions are set in an input image size for embedment of the respective size-reduced images of different sizes, and the plurality of size-reduced images are embedded in the embedded regions respectively, wherein the plurality of size-reduced images of different sizes are respectively embedded in the plurality of embedded regions by generating the plurality of size-reduced images of different sizes through size-reduction processing of the input image in plural stages and by sequentially outputting signals of the plurality of size-reduced images of different sizes, and further comprising outputting the embedded image, wherein said outputting the embedded image causes outputting of the plurality of size-reduced images with different resolutions at the same time.

16. The image processing method of claim 15, wherein the input image size is associated with the resolution of the image signal.

\* \* \* \* \*